(12) United States Patent
Rhodes

(10) Patent No.: US 7,752,169 B2
(45) Date of Patent: Jul. 6, 2010

(54) METHOD, SYSTEM AND PROGRAM PRODUCT FOR CENTRALLY MANAGING COMPUTER BACKUPS

(75) Inventor: James J. Rhodes, Bethlehem, PA (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 10/162,810

(22) Filed: Jun. 4, 2002

(65) Prior Publication Data

US 2003/0225733 A1    Dec. 4, 2003

(51) Int. Cl.
*G06F 7/00*    (2006.01)
(52) U.S. Cl. ............... 707/640; 707/641; 707/648
(58) Field of Classification Search ........ 707/201–204, 707/1, 10; 709/230; 714/2, 6, 12, 15, 16, 714/19, 20
See application file for complete search history.

(56) References Cited

U.S. PATENT DOCUMENTS

| | | | |
|---|---|---|---|
| 4,710,870 A | 12/1987 | Blackwell et al. | |
| 5,675,725 A | 10/1997 | Malcolm | |
| 5,875,478 A | 2/1999 | Blumenau | |
| 6,283,260 B1 * | 9/2001 | Yasuda, Sr. | 190/102 |
| 6,334,126 B1 * | 12/2001 | Nagatomo et al. | 707/4 |
| 6,356,916 B1 * | 3/2002 | Yamatari et al. | 707/201 |
| 6,393,442 B1 * | 5/2002 | Cromarty et al. | 715/523 |
| 6,735,676 B1 * | 5/2004 | Kanda et al. | 711/147 |
| 6,745,210 B1 * | 6/2004 | Scanlan et al. | 707/204 |
| 6,778,668 B1 * | 8/2004 | Nielsen | 380/201 |

* cited by examiner

*Primary Examiner*—Cheyne D Ly
(74) *Attorney, Agent, or Firm*—Arthur J. Samodovitz

(57) ABSTRACT

A method, system and program product for centrally managing computer backups are provided. Specifically, backup data is received to a backup system from at least one computer system in one or more formats. Once received, the backup data is converted from the format in which it was received to a central format, and then communicated to a central system. Once received by the central system, the converted backup data can be analyzed, and reports based thereon can be generated.

10 Claims, 4 Drawing Sheets

METHOD, SYSTEM AND PROGRAM PRODUCT FOR CENTRALLY MANAGING COMPUTER BACKUPS

BACKGROUND OF THE INVENTION

1. Field of the Invention

The present invention relates to a method, system and program product for centrally managing computer backups. More specifically, the present invention provides a method, system and program product for centrally managing computer backups for multiple backup solutions.

2. Background Art

As the use of computers in business become more pervasive, the need to provide effective data management grows. Specifically, many businesses implement computer networks to foster the growth and efficiency of their operations. Because such networks often play a vital role in the success of the businesses, the computer systems on the networks should be routinely backed up. Failure to provide regular backups can lead to great loss for businesses in the event of a system malfunction (e.g., crashes). In general, computer systems on a network are backed up to a "backup server" (or the like) using a backup software program, with one backup server accommodating one or more computer systems. In addition to backing up data from the computer systems, it is common for the backup programs to generate and transmit backup data (i.e., details of the backup operation) to the backup server. Such backup data useful in determining whether the backup was successful.

Heretofore, backup programs have generally been created for use with a specific platform/operating system. For example, VERITAS NETBACKUP is commonly used to backup computer systems operating under a Unix platform, while TIVOLI STORAGE MANAGER is commonly used to backup computer systems operating under a Windows NT platform. In addition, each backup program generally requires its own reporter program to gather and arrange the backup data into a useable format for analysis. For example, the reporter program SERVICE REPORTER is required to gather and format backup data from VERITAS NETBACKUP. Because a backup server could be a backup destination for numerous computer systems operating with different backup programs, the backup servers could have several different reporter programs loaded thereon.

This current use of multiple different backup and reporter programs renders the management of the computer backups extremely difficult. Specifically, not only must the businesses incur the cost of purchasing separate reporter programs for each different backup program, but the review of the backup data could be extremely burdensome. Specifically, computer networks can incorporate any number of computer systems distributed over a large geographical area. In order to review the backup data generated by the backup programs, a user/administrator will have to access each individual backup server and run the appropriate reporter programs. Such a commitment requires a tremendous dedication of resources on the part of the businesses.

In view of the foregoing, there exists a need for a method, system and program product for centrally managing computer backups. Specifically, a need exists for a method, system and program product that allows backup data generated by backup programs to be transmitted to one or more backup servers, formatted into a central format, and then transmitted to a central server for centralized review by a user/administrator. Such a method, system and program product would eliminate the need for separate reporter programs and/or the need to access individual backup servers to review the backup data.

SUMMARY OF THE INVENTION

In general, the present invention provides a method, system and program product for centrally managing computer backups. Specifically, backup data is received on one or more backup servers from various computer systems. The backup data is then converted to a central format by an agent program executing on the backup servers. Once converted, the backup data is transmitted to a central system where it is analyzed and reported. Accordingly, regardless of the format in which the backup data is received by the backup servers, it will be converted to a central format and transmitted to a central location for review.

According to a first aspect of the present invention, a method for centrally managing computer backups is provided. The method comprises: (1) receiving backup data to a backup system from a backup application, wherein the backup data is received in a first format; (2) converting the backup data to a central format on the backup system; and (3) transferring the converted backup data to a central system.

According to a second aspect of the present invention, a method for centrally managing computer backups is provided. The method comprises: (1) receiving a plurality of sets of backup data to at least one backup system from a plurality of backup applications, wherein the plurality of sets of backup data is received in a plurality of formats; (2) converting each of the plurality of sets of backup data to a central format on the at least one backup system; and (3) transferring each of the converted plurality of sets of backup data to a central system.

According to a third aspect of the present invention, a method for centrally managing computer backups is provided. The method comprises: (1) receiving a first set of backup data to a backup system from a first backup application in a first format; (2) receiving a second set of backup data to the backup system from a second backup application in a second format; (3) converting the first set of backup data and the second set of backup data to a central format on the backup system; and (4) transferring the converted first set of backup data and the converted second set of backup data to a central system.

According to a fourth aspect of the present invention, a method for centrally managing computer backups is provided. The method comprises: (1) receiving a first set of backup data to a first backup system from a first backup application; (2) receiving a second set of backup data to a second backup system from a second backup application; (3) converting the first set of backup data to a central format on the first backup system; (4) converting the second set of backup data to the central format on the second backup system; (5) transferring the converted first set of backup data to a central system; and (6) transferring the converted second set of backup data to the central system.

According to a fifth aspect of the present invention, a system for centrally managing computer backups is provided. The system comprises: (1) a backup data reception system for receiving backup data to a backup system from a backup program in a first format; (2) a conversion system for converting the backup data to a central format; and (3) a transfer system for transferring the converted backup data to a central system.

According to a sixth aspect of the present invention, a program product stored on a recordable medium for centrally managing computer backups is provided. When executed, the program product comprises: (1) program code for receiving backup data to a backup system from a backup program in a first format; (2) program code for converting the backup data to a central format; and (3) program code for transferring the converted backup data to a central system.

Therefore, the present invention provides a method, system and program product for centrally managing computer backups.

BRIEF DESCRIPTION OF THE DRAWINGS

These and other features of this invention will be more readily understood from the following detailed description of the various aspects of the invention taken in conjunction with the accompanying drawings in which.

Figure 1:
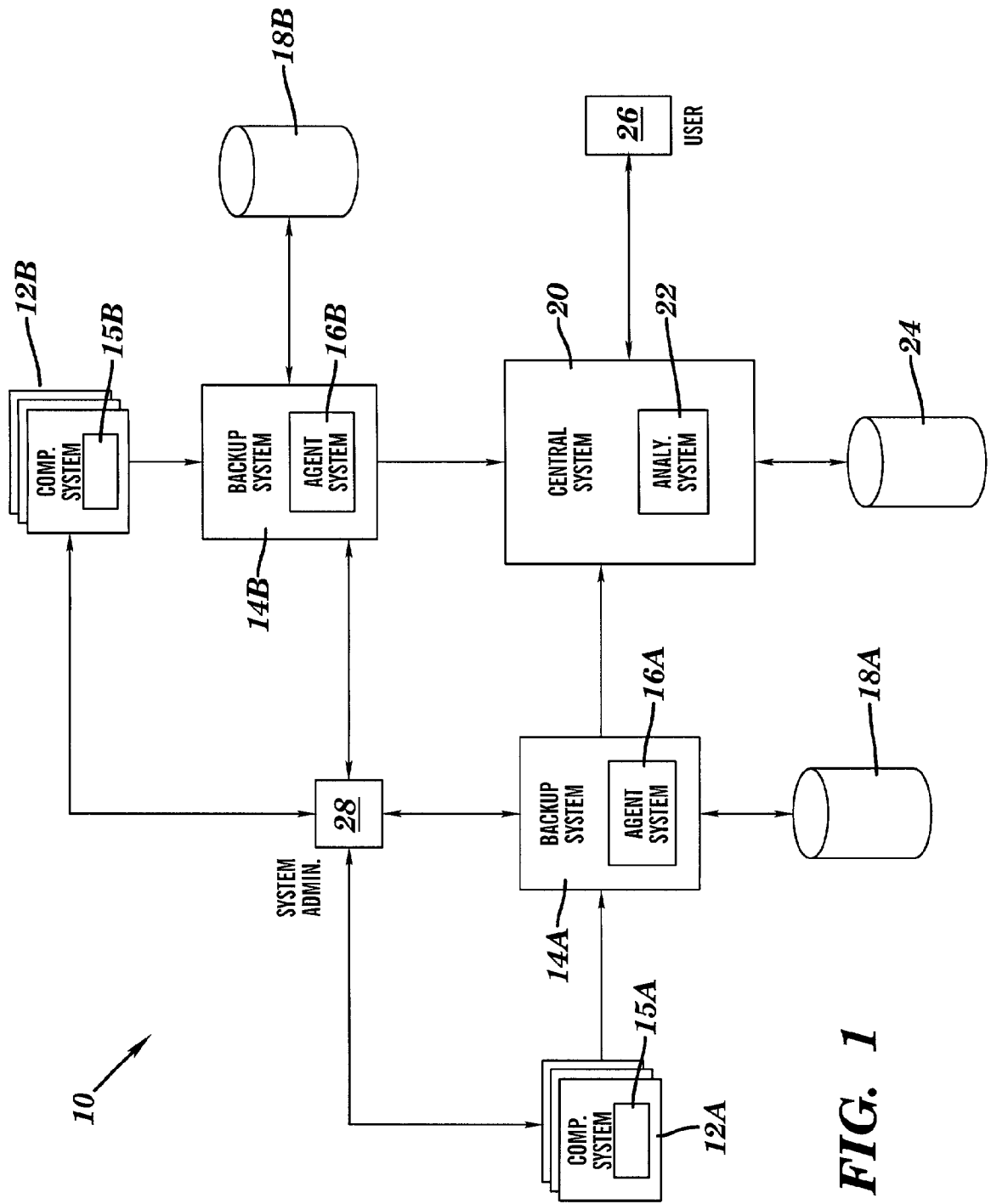
FIG. 1 depicts a block diagram of a system for centrally managing computer backups according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for centrally managing computer backups. Referring now to FIG. 1, system 10 is shown. As depicted, system 10 includes computer systems 12A-B communicating with and being backed up to backup systems 14A-B, respectively. In general, computer systems 12A-B and backup systems 14A-B could be part of a computer network. For example, computer systems 12A and backup system 14A could be implemented as a LAN, WAN, VPN or other network. Moreover, computer systems 12B and backup system 14B could be part of the same network as computer systems 12A and backup system 14B, or could be implemented as a separate network. Typically, backup systems 14A-B are servers dedicated to backing up computer systems 12A-B (although this need not be the case). Moreover, as shown, each backup system 14A-B can include backup databases 18A-B and can accommodate one or more computer systems 12A-B. It should also be appreciated that two backup servers 14A-B are shown for exemplary purposes only and that the present invention could be implemented with any quantity thereof.

As described above, computer systems 12A-B are backed up to backup systems 14A-B via backup software programs 15A-B that are loaded on each computer system 12A-B. Moreover, as further indicated above, each backup program 15A-B is typically written to function in conjunction with a particular operating system/platform. To this extent, each of computer systems 12A-B could have a different backup program 15A-B loaded thereon. In any event, each backup program 15A-B will cause data to be backed up from computer systems 12A-B to backup systems 14A-B. As known in the art, the precise data/drives that are backed up could be designated via the backup programs 15A-B by administrator 28.

Moreover, backups can be scheduled to run at particular times (e.g., Sunday nights at 11:00 P.M.). As the backup program is executing, backup data (i.e., meta data) detailing the backup operation is generated. Such backup data typically includes, among other things, a quantity of files attempted, a quantity of files actually backed up, details relating to errors during backup, files backed up, backup schedule information, whether the backup was full or incremental, etc. Depending on the particular backup program 15A-B being implemented, these details could be arranged in different formats. For example, error information could be expressed in location "A" of the backup data generated by backup program "A," but expressed in location "B" of backup data generated by backup program "B."

In previous systems, the backup data was transmitted to the backup servers along with the files being backed up. It was then up to the user to obtain and administer a separate reporter program to execute on the backup server to analyze the information. Specifically, the reporter program interprets the backup data and arranges the details into a useable format so that analysis can be efficiently performed. Unfortunately, because each backup program generally requires its own unique reporter program, networks implemented with numerous different backup programs required the implementation of numerous different reporter programs. Moreover, once the backup data was transmitted to the backup servers, a user/administrator would then have to access each backup server to assess the backup operations. This is extremely cumbersome for computer networks having several backup servers that are dispersed over a wide geographical area.

Under the present invention, backup data is transmitted as a file or the like to backup systems 14A-B from backup programs 15A-B. Agent systems 16A-B loaded on backup systems 14A-B are designed to receive the backup data in any format (i.e., regardless of the backup program that generated the backup data), and convert the backup data from the format of the corresponding backup program into a central (i.e., standard) format. For example, agent systems 16A-B are capable of receiving and converting a first set of backup data from a first backup program (e.g., VERITAS NETBACKUP) and a second set of backup data from a second backup program (e.g., TIVOLI STORAGE MANAGER). Accordingly, agent systems 16A-B, among other things, eliminate the need to implement numerous different reporter programs on backup systems 14A-B. In converting the backup data to a central format, agent systems 16A-B will analyze the sets of received backup data to identify various types of information. For example, agent systems 16A-B will analyze each set of backup data to: (1) determine the quantity of files the backup program attempted; (2) the quantity of files actually backed up; (3) error codes; (4) backup schedule information; (5) whether the backup was full or incremental, etc.

Once the backup data has been converted to the central format, it will be communicated (e.g., transmitted) from the backup systems 14A-B to central system 20. Analysis system 22 will receive the converted backup data and generate any reports for user 26. In generating reports, analysis system 22 could include an interface or the like for user 26 to, for example, manipulate the backup data, create/request specific reports, etc. If any problems are detected, user 26 and/or administrator 28 could access computer systems 12A-B and/or backup systems 14A-B as necessary. Thus, among other things, the present invention allows backup data for all computer systems 12A-B to be viewed and analyzed (e.g., managed) in a central location.

Figure 2:
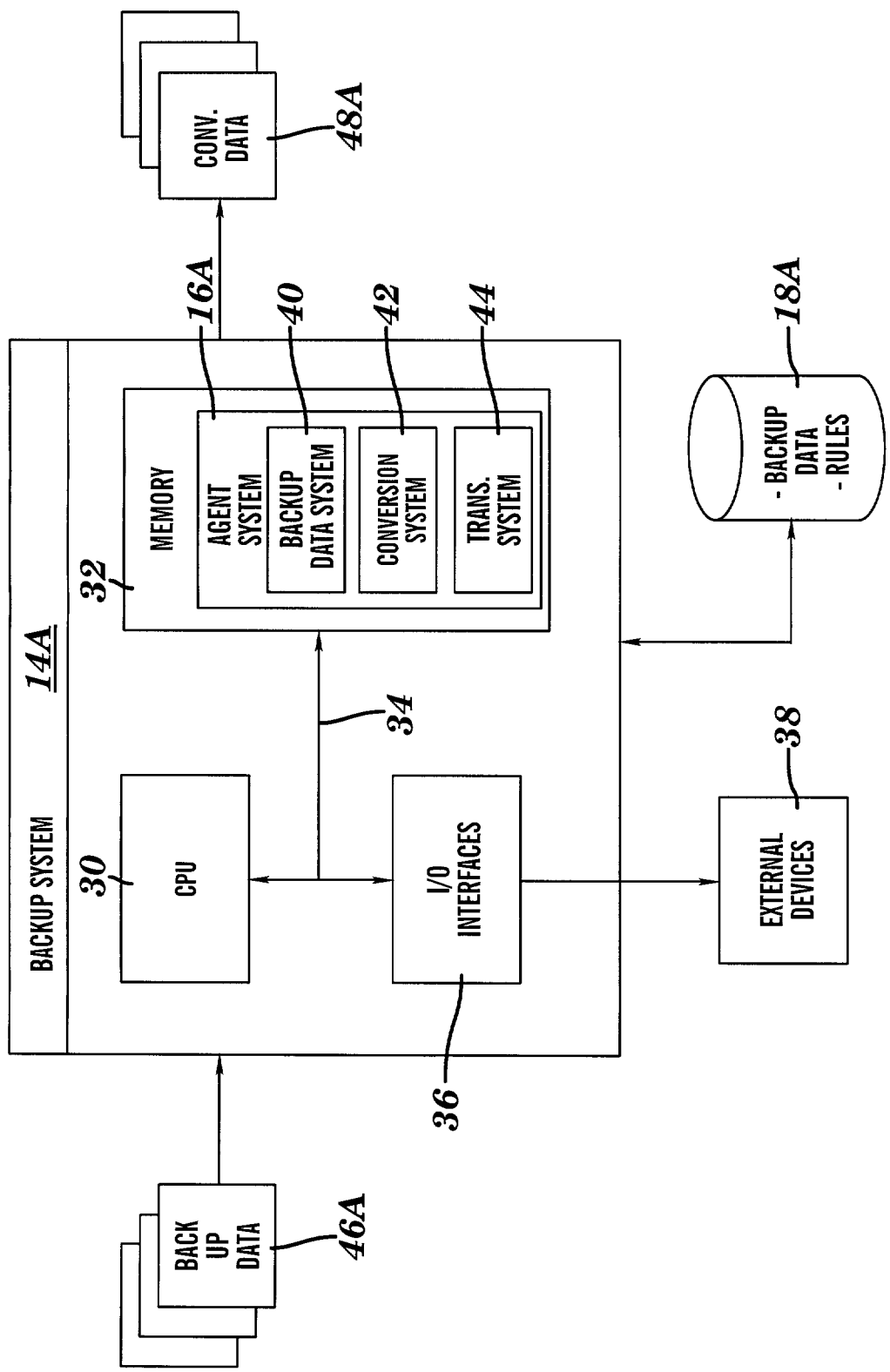
FIG. 2 depicts an exemplary backup system as shown in FIG. 1.

Referring now to FIG. 2, a computerized diagram of backup system 14A is shown. As depicted, backup system 14A generally comprises central processing unit (CPU) 30, memory 32, bus 34, input/output (I/O) interfaces 36, external devices/resources 38 and backup database 18A. CPU 30 may comprise a single processing unit, or be distributed across one or more processing units in one or more locations, e.g., on a client and server. Memory 32 may comprise any known type of data storage, including magnetic media, optical media, random access memory (RAM), read-only memory (ROM), a data cache, a data object, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LED screen, hand-held device, keyboard, mouse, voice recognition system, speech output system, printer, monitor, facsimile, pager, etc. Bus 34 provides a communication link between each of the components in backup system 14A and likewise may comprise any known type of transmission link, including electrical, optical, wireless, etc. In addition, although not shown, additional components, such as cache memory, communication systems, system software, etc., may be incorporated into backup system 14A.

Backup database 18A may provide storage for information necessary to carry out the present invention. Such information could include, among other things, backup data, conversion rules, etc. As such, backup database 18A may include one or more storage devices, such as a magnetic disk drive or an optical disk drive. In another embodiment, backup database 18A includes data distributed across, for example, a local area network (LAN), wide area network (WAN) or a storage area network (SAN) (not shown). Backup database 18A may also be configured in such a way that one of ordinary skill in the art may interpret it to include one or more storage devices. It should be understood that backup system 14B contains components (e.g., CPU, memory, etc.) similar to backup system 14A. Such components have not been separately depicted and described for brevity purposes.

Stored in memory 32 of backup system 14A is agent system program 16A. Agent system program 16A in backup system 14A is stored in disk for execution by CPU 30 via RAM. As shown a ent system 16A includes backup data reception system 40, conversion system 42 and transfer system 44. Backup data reception system 40 receives one or more sets of backup data 46A (e.g., as files) from backup programs 15A loaded on computer systems 12A (FIG. 1). As indicated above, the format of backup data 46A can vary depending on the particular backup programs 15A executing on computer systems 12A. Once received, the (sets of) backup data 46A can be optionally stored in backup database 18A.

Conversion system 42 will access backup database 18A to identify the backup program(s) 15A that produced the one or more received sets of backup data 46A, and then convert the backup data from the format of backup program 15A to a central format. In a typical embodiment, backup program 15A is identified based on the format of the backup data. Specifically, conversion system 42 is programmed to recognize the format of the backup data produced by the different backup programs 15A. Thus, when a set of backup data is received, it can be associated with its particular backup program 15A. Conversion of the backup data typically involves rearranging the information so that the pieces of information that are common to all backup programs 15A are arranged in the same locations within the converted backup data sets 48A.

To this extent, one or more conversion rules could be provided in backup database 18A. Such rules could indicate how/where each desired piece of information is stored for each type of backup program, and how/where the information should be arranged in the central format. For example, for the following information: (1) quantity of files attempted; and (2) quantity of files actually backed up, the conversion rules could be as follows:

| INFORMATION | BACKUP PROGRAM | CURRENT LOCATION | CENTRAL LOCATION |
|---|---|---|---|
| Quantity Attempted | Veritas NetBackup | A | 1 |
| | Tivoli Storage Manager | B | 1 |
| | BackupExec | C | 1 |
| Quantity Achieved | Veritas NetBackup | X | 2 |
| | Tivoli Storage Manager | Y | 2 |
| | BackupExec | Z | 2 |

Thus, sets of converted backup data 48A will have the same layout of data regardless of backup program 15A. For example, each set of converted backup data 48A will have "quantity of files attempted" information located in location "1," while "quantity of files achieved" information will be located in location "2."

Once the backup data 46A has been converted to the central format, the converted backup data 48A will be communicated to central system 20 via transfer system 44. It should be understood that communication between computer systems 12A-B, backup systems 14A-B and central system 20 could be provided through any known means. For example, computer systems 12A, backup system 16A and central system 20 could be connected via direct hardwired connections (e.g., serial port), or via addressable connections (e.g., remotely) in a client-server environment. In the case of the latter, the server and client may be connected via the Internet, wide area networks (WAN), local area networks (LAN) or other private networks. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server.

Although not shown, it should be understood that agent system 16A could further include an administration system that includes a user interface. The administration system could be used, for example, by administrator 28 to revise, update, or otherwise manipulate the programming of agent system 16A. It should also be appreciated that backup system 14B and agent program 16B typically have similar components (e.g., CPU, memory, etc.) and function similar to backup system 14A and agent system 16A. Such components have not be shown and described herein for brevity purposes.

Figure 3:
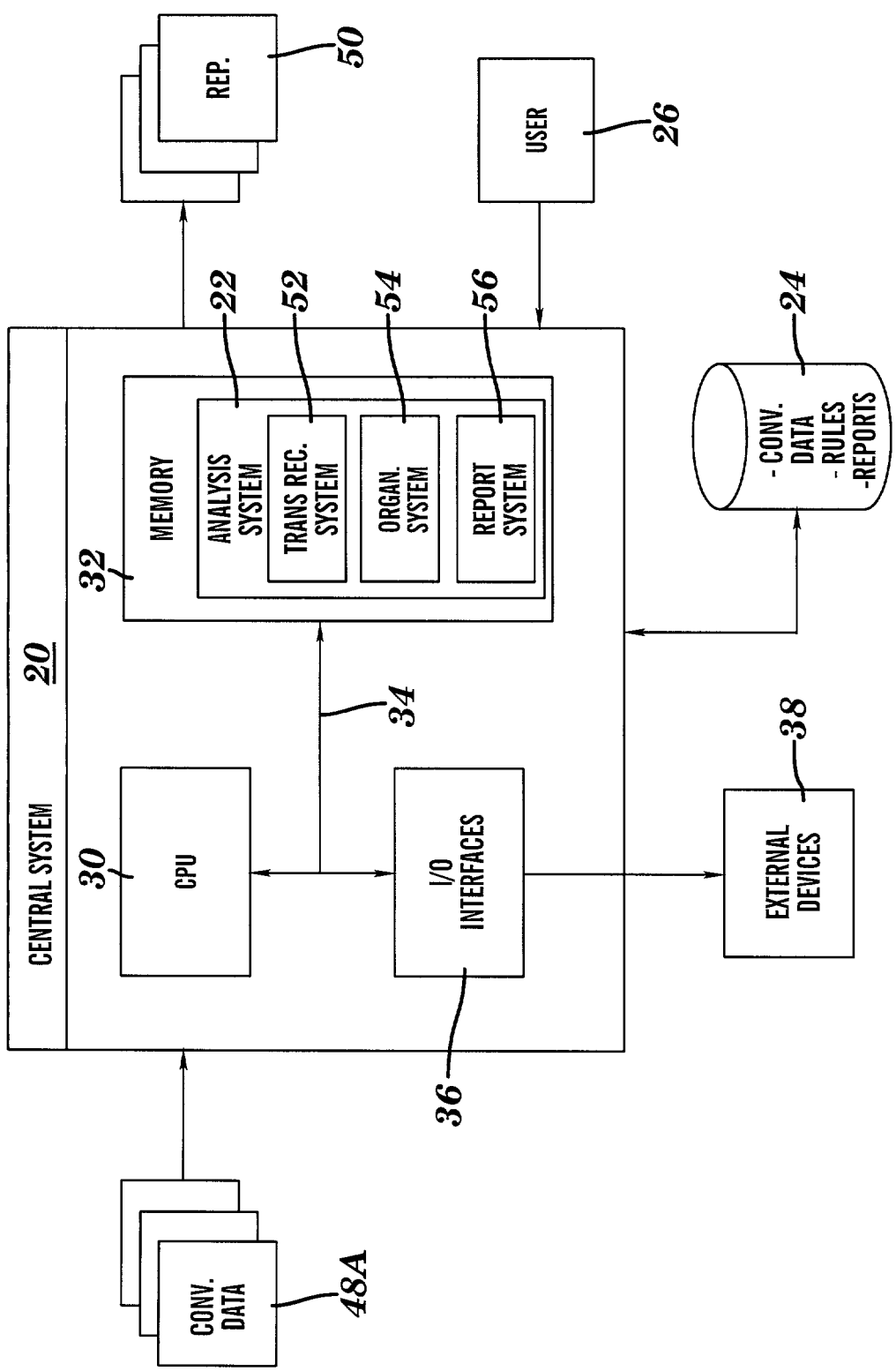
FIG. 3 depicts an exemplary central system as shown in FIG. 1.

Referring now to FIG. 3, a computerized diagram of central system 20 is shown. As depicted, central system 20 includes computerized components (e.g., CPU, memory, etc.) similar to backup systems 14A-B. However, loaded in memory 32 is analysis system 22, which includes transfer reception system 52, organization system 54 and report system 56. Converted data set(s) 48A that is transferred by backup systems 14A-B are received by transfer reception system 52 and optionally stored in central database 24. Once received, the converted data can be analyzed and arranged into reports 50 for user 26. Specifically, user 26 could interface with analysis system 22 to request specific pieces of information and/or reports 50. In addition, central database 24 could be programmed with specific reports that are automatically generated whenever a converted set of backup data 48A is received. Such programming could be performed during the creation of analysis system 22, specified by user 26 via the interface, etc. In any event, depending on the request made, organization system 54 would parse the converted backup data to retrieve and arrange the requested information. Once retrieved, reports 50 could be generated and outputted via report system 56. To this extent, central database 24 could also include organization rules that indicate where each piece of information is stored in the received converted backup data 48A. Because each set of received data is arranged in the central format, no concern need be paid regarding the type of backup programs and the format of the backup data generated thereby. Rather, the organization rules need only correlate each piece of information with a particular location in the converted data (files). For example, for the following information: (1) quantity of files attempted; and (2) quantity of files actually backed up the organization rules could be as follows:

| INFORMATION | CENTRAL LOCATION |
|---|---|
| Quantity Attempted | 1 |
| Quantity Achieved | 2 |

These rules would inform report system 56 where to look for particular pieces of information. For example, if both of the above pieces of information were requested in a report, report system 56 would reference location "1" for "quantity attempted" and location "2" for "quantity achieved."

Figure 4:
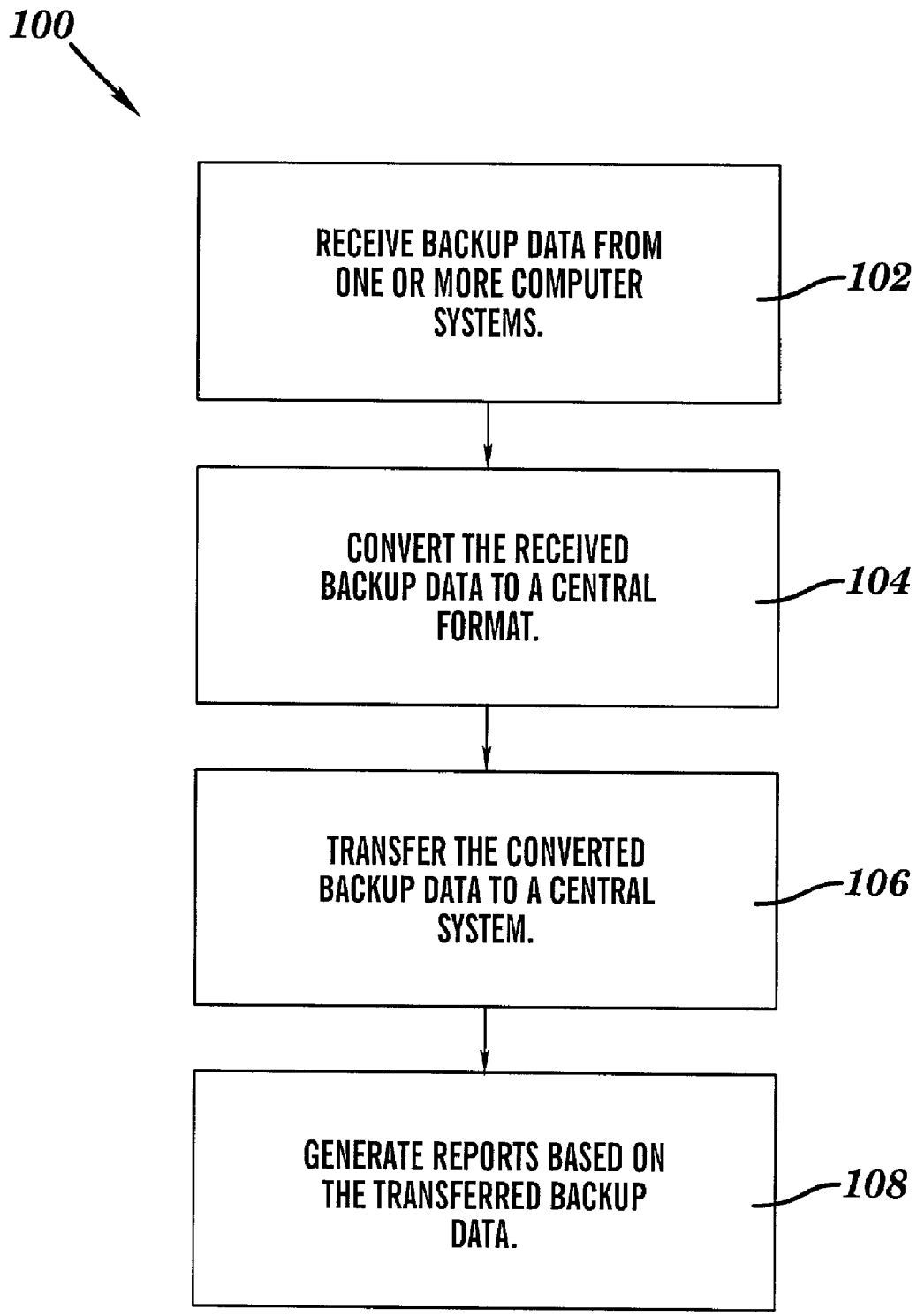
FIG. 4 depicts a method flow diagram according to the present invention.

Referring now to FIG. 4, a method flow diagram 100 of the present invention is shown. First step 102 of method is to receive backup data from one or more computer systems. Once received, second step 104 is to convert the backup data from a first format to a central format. After conversion, the backup data is then transferred to a central system in step 106. Once at the central system, reports based on the converted backup data can be generated in step 108.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls backup systems 14A-B and central system 20 such that they carry out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In a typical embodiment, the present invention is implemented using Lotus technology available from International Business Machines, Corp. of Armonk N.Y. For example, backup databases 18A-B and central database 24 could be implemented as Lotus Notes databases. Moreover, agent system 16A and/or analysis system 22 could be implemented using "agents" (e.g., programs that perform a function over a network) such as LotusScript agents.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, a particular arrangement of sub-systems have been depicted for agent systems 16A-B and analysis system 22 for exemplary purposes only. Accordingly, any equivalent variation could be implemented.

The invention claimed is:

1. A method for managing information about backups of first and second computers having first and second respective different backup programs that compile and report the information in first and second respective, different formats defining different relative locations in the first and second reports for same types of items of the information, the method comprising the steps of:

a third computer receiving in a first report in the first format first information about a backup of the first computer, the first information in the first format specifying (a) in a first location of the first report a quantity of files attempted to be backed up from the first computer, (b) in a second location of the first report a quantity of the files actually backed up from the first computer, (c) in a third location of the first report a code for an error in the backup of the first computer, and (d) in a fourth location in the first report whether the backup of the first computer was incremental or full;

the third computer receiving in a second report in the second format second information about a backup of the second computer, the second information in the second format specifying (a) in a fifth location of the second report a quantity of files attempted to be backed up from the second computer, (b) in a sixth location of the second report a quantity of the files actually backed up from the second computer, (c) in a seventh location of the second report a code for an error in the backup of the second computer, and (d) in an eighth location in the second report whether the backup of the second computer was incremental or full, wherein the first, second, third and fourth locations in the first report differ relatively from the fifth, sixth, seventh and eighth locations, respectively, in the second report;

the third computer re-formatting one or both of the first and second reports such that (a) relative report locations are substantially the same for the specifications of the respective quantities of files attempted to be backed up from the first and second computers, (b) relative report locations are substantially the same for the specifications of the respective quantities of the files actually backed up from the first and second computers, (c) relative report locations are substantially the same for the specifications of the respective codes for errors in the backup of the first and second computers, and (d) relative report locations are substantially the same for the specifications of whether the respective backups of the first and second computers were incremental or full; and the third computer generating a re-formatted report, based on the re-formatting step, for each of the one or both of the first reports which the third computer re-formatted.

2. The method of claim 1 wherein:

the third computer re-formats both of the first and second reports such that the (a) relative report locations are substantially the same for the specifications of the respective quantities of files attempted to be backed up from the first and second computers, (b) relative report locations are substantially the same for the specifications of the respective quantities of the files actually backed up from the first and second computers, (c) relative report locations are substantially the same for the specifications of the respective codes for errors in the backup of the first and second computers, and (d) relative report locations are substantially the same for the specifications of whether the respective backups of the first and second computers were incremental or full; and the third computer generating first and second re-formatted reports, based on the step of the third computer re-formatting both the first and second reports, for the first and second reports, respectively, which the third computer re-formatted.

3. A server for managing information about backups of first and second computers having first and second respective different backup programs that compile and report the information in first and second respective, different formats defining different relative locations in the first and second reports for same types of items of the information, the server comprising:

a CPU, a computer readable memory and a computer readable storage media;

first program instructions to receive in a first report in the first format first information about a backup of the first computer, the first information in the first format specifying (a) in a first location of the first report a quantity of files attempted to be backed up from the first computer, (b) in a second location of the first report a quantity of the files actually backed up from the first computer, (c) in a third location of the first report a code for an error in the backup of the first computer, and (d) in a fourth location in the first report whether the backup of the first computer was incremental or full;

second program instructions to receive in a second report in the second format second information about a backup of the second computer, the second information in the second format specifying (a) in a fifth location of the second report a quantity of files attempted to be backed up from the second computer, (b) in a sixth location of the second report a quantity of the files actually backed up from the second computer, (c) in a seventh location of the second report a code for an error in the backup of the second computer, and (d) in an eighth location in the second report whether the backup of the second computer was incremental or full, wherein the first, second, third and fourth locations in the first report differ relatively from the fifth, sixth, seventh and eighth locations, respectively, in the second report;

third program instructions to re-format one or both of the first and second reports such that (a) relative report locations are substantially the same for the specifications of the respective quantities of files attempted to be backed up from the first and second computers, (b) relative report locations are substantially the same for the specifications of the respective quantities of the files actually backed up from the first and second computers, (c) relative report locations are substantially the same for the specifications of the respective codes for errors in the backup of the first and second computers, and (d) relative report locations are substantially the same for the specifications of whether the respective backups of the first and second computers were incremental or full; and fourth program instructions to generate a re-formatted report, based on the re-formatting step, for each of the one or both of the first reports which the third computer re-formatted; and wherein the first, second, third and fourth program instructions are stored on the computer readable storage media for execution by the CPU via the computer readable memory.

4. The server of claim 3 wherein:

the third program instructions re-format both of the first and second reports such that the (a) relative report locations are substantially the same for the specifications of the respective quantities of files attempted to be backed up from the first and second computers, (b) relative report locations are substantially the same for the specifications of the respective quantities of the files actually backed up from the first and second computers, (c) relative report locations are substantially the same for the specifications of the respective codes for errors in the backup of the first and second computers, and (d) relative report locations are substantially the same for the specifications of whether the respective backups of the first and second computers were incremental or full; and the fourth program instructions generate first and second re-formatted reports, based on the step of the third computer re-formatting both the first and second reports, for the first and second reports, respectively, which the third computer re-formatted.

5. A computer program product for execution in a server for managing information about backups of first and second computers having first and second respective different backup programs that compile and report the information in first and second respective, different formats defining different relative locations in the first and second reports for same types of items of the information, the computer program product comprising:

a computer readable storage media;

first program instructions to receive in a first report in the first format first information about a backup of the first computer, the first information in the first format specifying (a) in a first location of the first report a quantity of files attempted to be backed up from the first computer, (b) in a second location of the first report a quantity of the files actually backed up from the first computer, (c) in a third location of the first report a code for an error in the backup of the first computer, and (d) in a fourth location in the first report whether the backup of the first computer was incremental or full;

second program instructions to receive in a second report in the second format second information about a backup of the second computer, the second information in the second format specifying (a) in a fifth location of the second report a quantity of files attempted to be backed up from the second computer, (b) in a sixth location of the second report a quantity of the files actually backed up from the second computer, (c) in a seventh location of the second report a code for an error in the backup of the second computer, and (d) in an eighth location in the second report whether the backup of the second computer was incremental or full, wherein the first, second, third and fourth locations in the first report differ relatively from the fifth, sixth, seventh and eighth locations, respectively, in the second report;

third program instructions to re-format one or both of the first and second reports such that (a) relative report locations are substantially the same for the specifications of the respective quantities of files attempted to be backed up from the first and second computers, (b) relative report locations are substantially the same for the specifications of the respective quantities of the files actually backed up from the first and second computers, (c) relative report locations are substantially the same for the specifications of the respective codes for errors in the backup of the first and second computers, and (d) relative report locations are substantially the same for the specifications of whether the respective backups of the first and second computers were incremental or full; and fourth program instructions to generate a re-formatted report, based on the re-formatting step, for each of the one or both of the first reports which the third computer re-formatted; and wherein the first, second, third and fourth program instructions are stored on the computer readable storage media.

6. The computer program product of claim 5 wherein:

the third program instructions re-format both of the first and second reports such that the (a) relative report locations are substantially the same for the specifications of the respective quantities of files attempted to be backed up from the first and second computers, (b) relative report locations are substantially the same for the specifications of the respective quantities of the files actually backed up from the first and second computers, (c) relative report locations are substantially the same for the specifications of the respective codes for errors in the backup of the first and second computers, and (d) relative report locations are substantially the same for the specifications of whether the respective backups of the first and second computers were incremental or full; and the fourth program instructions generate first and second re-formatted reports, based on the step of the third computer re-formatting both the first and second reports, for the first and second reports, respectively, which the third computer re-formatted.

7. A server for managing information about backups of first and second computers having first and second respective different backup programs that compile and report the information in first and second respective, different formats defining different relative locations in the first and second reports for same types of items of the information, the server comprising:

a CPU, a computer readable memory and a computer readable storage media;

first program instructions to receive in a first report in the first format first information about a backup of the first computer, the first information in the first format specifying (a) in a first location of the first report a quantity of files attempted to be backed up from the first computer, (b) in a second location of the first report a quantity of the files actually backed up from the first computer, and (c) in a third location of the first report a code for an error in the backup of the first computer;

second program instructions to receive in a second report in the second format second information about a backup of the second computer, the second information in the second format specifying (a) in a fifth location of the second report a quantity of files attempted to be backed up from the second computer, (b) in a sixth location of the second report a quantity of the files actually backed up from the second computer, and (c) in a seventh location of the second report a code for an error in the backup of the second computer;

third program instructions to re-format one or both of the first and second reports such that (a) relative report locations are substantially the same for the specifications of the respective quantities of files attempted to be backed up from the first and second computers, (b) relative report locations are substantially the same for the specifications of the respective quantities of the files actually backed up from the first and second computers, and (c) relative report locations are substantially the same for the specifications of the respective codes for errors in the backup of the first and second computers; and fourth program instructions to generate a re-formatted report, based on the re-formatting step, for each of the one or both of the first reports which the third computer re-formatted; and wherein the first, second, third and fourth program instructions are stored on the computer readable storage media for execution by the CPU via the computer readable memory.

8. The server of claim 7 wherein:

the third program instructions re-format both of the first and second reports such that the (a) relative report locations are substantially the same for the specifications of the respective quantities of files attempted to be backed up from the first and second computers, (b) relative report locations are substantially the same for the specifications of the respective quantities of the files actually backed up from the first and second computers, and (c) relative report locations are substantially the same for the specifications of the respective codes for errors in the backup of the first and second computers; and the fourth program instructions generate first and second re-formatted reports, based on the step of the third computer re-formatting both the first and second reports, for the first and second reports, respectively, which the third computer re-formatted.

9. A computer program product for execution in a server for managing information about backups of first and second computers having first and second respective different backup programs that compile and report the information in first and second respective, different formats defining different relative locations in the first and second reports for same types of items of the information, the computer program product comprising:

a computer readable storage media;

first program instructions to receive in a first report in the first format first information about a backup of the first computer, the first information in the first format specifying (a) in a first location of the first report a quantity of files attempted to be backed up from the first computer, (b) in a second location of the first report a quantity of the files actually backed up from the first computer, and (c) in a third location of the first report a code for an error in the backup of the first computer;

second program instructions to receive in a second report in the second format second information about a backup of the second computer, the second information in the second format specifying (a) in a fifth location of the second report a quantity of files attempted to be backed up from the second computer, (b) in a sixth location of the second report a quantity of the files actually backed up from the second computer, and (c) in a seventh location of the second report a code for an error in the backup of the second computer;

third program instructions to re-format one or both of the first and second reports such that (a) relative report locations are substantially the same for the specifications of the respective quantities of files attempted to be backed up from the first and second computers, (b) relative report locations are substantially the same for the specifications of the respective quantities of the files actually backed up from the first and second computers, and (c) relative report locations are substantially the same for the specifications of the respective codes for errors in the backup of the first and second computers; and fourth program instructions to generate a re-formatted report, based on the re-formatting step, for each of the one or both of the first reports which the third computer re-formatted; and wherein the first, second, third and fourth program instructions are stored on the computer readable storage media.

10. The computer program product of claim 9 wherein:

the third program instructions re-format both of the first and second reports such that the (a) relative report locations are substantially the same for the specifications of the respective quantities of files attempted to be backed up from the first and second computers, (b) relative report locations are substantially the same for the specifications of the respective quantities of the files actually backed up from the first and second computers, and (c) relative report locations are substantially the same for the specifications of the respective codes for errors in the backup of the first and second computers; and the fourth program instructions generate first and second re-formatted reports, based on the step of the third computer re-formatting both the first and second reports, for the first and second reports, respectively, which the third computer re-formatted.

* * * * *